(12) United States Patent
Verschueren

(10) Patent No.: US 10,317,766 B2
(45) Date of Patent: Jun. 11, 2019

(54) ELECTRODE LAYOUT FOR A DISPLAY

(75) Inventor: Alwin Rogier Martijn Verschueren, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 2043 days.

(21) Appl. No.: 12/307,813

(22) PCT Filed: Jul. 3, 2007

(86) PCT No.: PCT/IB2007/052587
§ 371 (c)(1),
(2), (4) Date: Jan. 7, 2009

(87) PCT Pub. No.: WO2008/007300
PCT Pub. Date: Jan. 17, 2008

(65) Prior Publication Data
US 2009/0231242 A1    Sep. 17, 2009

(30) Foreign Application Priority Data

Jul. 11, 2006   (EP) .................................... 06117000

(51) Int. Cl.
| | | |
|---|---|---|
| *G09G 3/30* | (2006.01) | |
| *G02F 1/167* | (2019.01) | |
| *G02F 1/1343* | (2006.01) | |
| *G02F 1/1345* | (2006.01) | |
| *G02F 1/1676* | (2019.01) | |

(52) U.S. Cl.
CPC ............ *G02F 1/167* (2013.01); *G02F 1/1345* (2013.01); *G02F 1/134363* (2013.01); *G02F 1/1676* (2019.01)

(58) Field of Classification Search
CPC ............ G02F 1/167; G02F 2001/1676; G02F 1/134363; G02F 1/1345
USPC .......................................... 345/107; 359/296
See application file for complete search history.

(56) References Cited

U.S. PATENT DOCUMENTS

| | | | |
|---|---|---|---|
| 3,612,758 A | | 10/1971 | Evans et al. |
| 4,694,287 A | | 9/1987 | Chenevas-Paule |
| 4,808,983 A | * | 2/1989 | Benjamin ............. G02F 1/1343 |
| | | | 345/212 |
| 6,011,532 A | | 1/2000 | Yanai et al. |
| 6,404,477 B1 | | 6/2002 | Fujiwara et al. |
| 6,587,161 B1 | | 7/2003 | Yamamoto et al. |

(Continued)

FOREIGN PATENT DOCUMENTS

| | | |
|---|---|---|
| JP | 63124034 A | 5/1988 |
| WO | 03016993 A1 | 2/2003 |

(Continued)

*Primary Examiner* — Vinh T Lam

(57) ABSTRACT

The display device (10) comprises an array of rows and columns of pixels. The display device further comprises a plurality of commonly controlled first electrodes (FE) for supplying a common signal (DS1) to each pixel (13), a plurality of commonly controlled second electrodes (SE) for supplying a further common signal (DS2) to each pixel, and a plurality of pixel addressing electrodes (AC1, AC2, AC3, AC4) for addressing the individual pixels. At least the plurality of first electrodes and the plurality of second electrodes are routed parallel to one another, such that crossovers between the commonly controlled electrodes are eliminated.

10 Claims, 4 Drawing Sheets

(56) References Cited

U.S. PATENT DOCUMENTS

| | | | |
|---|---|---|---|
| 6,741,385 B2* | 5/2004 | Ikeda | G02F 1/167 345/107 |
| 7,508,479 B2* | 3/2009 | Kim | G09G 3/3688 349/149 |
| 9,075,490 B2* | 7/2015 | Hotelling | G02F 1/13338 |
| 2001/0030639 A1* | 10/2001 | Goden | G02F 1/167 345/107 |
| 2003/0035198 A1* | 2/2003 | Liang | G02F 1/167 359/296 |
| 2003/0058396 A1 | 3/2003 | Shih | |
| 2003/0090614 A1* | 5/2003 | Kim | G09G 3/3688 349/149 |
| 2003/0095094 A1* | 5/2003 | Goden | G02F 1/167 345/107 |
| 2003/0218593 A1* | 11/2003 | Inoue | G09G 3/3655 345/92 |
| 2003/0231162 A1* | 12/2003 | Kishi | G02F 1/167 345/107 |
| 2004/0126911 A1* | 7/2004 | Kimura | H01L 27/12 438/22 |
| 2005/0174321 A1* | 8/2005 | Ikeda | G02F 1/167 345/107 |
| 2005/0179641 A1* | 8/2005 | Zhou | G09G 3/344 345/107 |
| 2006/0152666 A1* | 7/2006 | Ono | G02F 1/134309 349/151 |
| 2007/0001962 A1* | 1/2007 | Hasegawa | G09G 3/3651 345/95 |
| 2007/0229423 A1* | 10/2007 | Tyrrell | G09G 3/3622 345/89 |
| 2008/0239461 A1* | 10/2008 | Maeda | G02F 1/167 359/296 |
| 2009/0027328 A1* | 1/2009 | Johnson | G02F 1/134363 345/107 |

FOREIGN PATENT DOCUMENTS

| | | |
|---|---|---|
| WO | 03023510 A1 | 3/2003 |
| WO | 2004008238 A1 | 1/2004 |

\* cited by examiner

ELECTRODE LAYOUT FOR A DISPLAY

This invention relates to an improved electrode layout for a display device, and in particular for in-plane electrophoretic display devices.

Display devices such as Liquid Crystal Displays (LCD), Thin Film Diode (TFD) displays, and Electrophoretic displays are well known to those skilled in the art. Display devices typically comprise a plurality of display pixels that are arranged in an array of rows and columns, and that are controllable by various control electrodes. The total number of control electrodes that are required typically depends on the type and number of display pixels that are to be driven.

Electrophoretic displays have been known for many years; for example from U.S. Pat. No. 3,612,758. The fundamental principle of electrophoretic displays is that the appearance of an electrophoretic material encapsulated in the display is controllable by means of electrical fields.

So called "In-plane" electrophoretic pixels use electric fields that are lateral to the display substrate to move particles from a masked area hidden from the viewer to an active viewing area. The larger the number of particles that are moved to or from the active area, the greater the change in the optical appearance of the pixel. Applicant's International Application WO2004/008238 gives an example of a typical in-plane electrophoretic display.

An important consideration for display devices is the number of crossovers between the various control electrodes. The more times the various electrodes cross over one another, the more chance there is that one of the crossovers will short-circuit and connect the crossing electrodes together.

Hence, as the number of crossovers increase, the yield of the manufacturing process may reduce, and the chances of faults developing once the display is in use may increase.

Additionally, crossovers typically lead to capacitive coupling between the crossing electrodes, which may lead to noise being induced in the signals carried by each electrode.

One technique for reducing the number of crossovers is to arrange the various electrodes on different substrate layers, thereby minimizing the risk of short circuits occurring and reducing the capacitive coupling between the electrodes. For example, a TFD display may comprise an array of rows and columns of pixels disposed between first and second substrate layers, wherein the row addressing electrodes are arranged on a first substrate layer, and wherein the column addressing electrodes are arranged on the second substrate layer. Hence, the row and column electrodes are spaced apart by the pixel materials, and so short-circuits and capacitive coupling between the electrodes are minimized. U.S. Pat. No. 4,694,287 discusses a similar approach in the context of displays that are formed by two substrates spaced apart by an optically active material (e.g. LCD).

However, this method requires electrodes to be patterned on two substrates rather than just one, which may be more expensive to manufacture.

Another important consideration for the electrode layout, is the proportion of the area of the display that is required to support the electrodes. If the electrodes occupy a larger area of the display, then typically a smaller area of the display will be available for active pixel areas that are controlled to give the display its optical appearance. The ratio of active pixel area (area whose optical appearance can be controlled) to inactive pixel area (area whose optical appearance cannot be controlled) is commonly known as the aperture ratio. The higher the aperture ratio, the higher the fraction of the pixel that can be controlled to change the pixel's optical appearance. A high aperture ratio enables a brighter display with a higher contrast ratio, and so it is desirable to minimize the area of each pixel that is occupied by the control electrodes.

It is therefore an object of the invention to provide an electrode layout that improves on the prior art.

According to a first aspect of the invention, there is provided a display device comprising an array of rows and columns of pixels, the array comprising:

a commonly controlled plurality of first electrodes for supplying a common signal to each pixel of the array, each first electrode extending through or alongside a row of pixels for supplying the common signal to the pixels of the row;

a commonly controlled plurality of second electrodes for supplying a further common signal to each pixel of the array, each second electrode extending through or alongside a row of pixels for supplying the further common signal to the pixels of the row; and a plurality of pixel addressing electrodes for supplying data to the pixels to control the optical appearances of the pixels; and wherein at least the first and second pluralities of electrodes are arranged on a common substrate.

Accordingly, crossovers between the commonly controlled plurality of first electrodes and the commonly controlled plurality of second electrodes within the pixel array, are eliminated by routing the first and second electrodes in the row direction so that they run parallel to one another.

A commonly controlled plurality of electrodes comprises electrodes that are all to be driven with the same (common) drive signal. For example, a voltage pulse in the common drive signal will result in a voltage pulse on all of the commonly controlled plurality of electrodes. A short-circuit that affects an electrode of a commonly controlled plurality of electrodes, often also affects the common drive signal, and thereby also affects the other electrodes of the commonly controlled plurality of electrodes. Therefore, short-circuits that affect an electrode of a plurality of commonly controlled electrodes, and in particular short-circuits between an electrode of one commonly controlled plurality of electrodes and an electrode of another commonly controlled plurality of electrodes, often have far-reaching effects that typically result in the most severe faults in the appearance of the display.

Hence, there is provided an electrode layout within the pixel array that both minimizes the overall number of electrode crossovers, and that eliminates the electrode crossovers between the particular electrodes, that if short-circuited, would have the most disastrous effects on display performance.

Additionally, each row may be associated with a first electrode that extends from the first pixel of the row to the last pixel of the row, thereby supplying the common signal to every pixel of the row. Furthermore, each row may be associated with a second electrode that extends from the first pixel of the row to the last pixel of the row, thereby supplying the further common signal to every pixel of the row.

Advantageously, the pluralities of electrodes may at least partially form a passive matrix for controlling the pixels of the display device. Alternatively, the pluralities of electrodes may at least partially form an active matrix, in conjunction with active circuitry within the pixels of the display device.

Furthermore, the pluralities of electrodes may be used for controlling an array of in-plane electrophoretic pixels.

Advantageously, the plurality of pixel addressing electrodes may comprise a plurality of third electrodes and a plurality of fourth electrodes, wherein each third electrode extends through or alongside a row of pixels, and wherein each fourth electrode extends through or alongside a column of pixels. Hence, there may be provided a display device comprising third (row) electrodes and fourth (column) electrodes that may be used to address each pixel of the array. Furthermore, since the third electrodes extend in the row direction, crossovers between the pluralities of first, second, and third electrodes are avoided.

Furthermore, the pluralities of first, second, third and fourth electrodes may be arranged on a common substrate, thereby minimizing the cost of manufacturing without risking large numbers of crossovers.

Furthermore, the first, second, and third pluralities of electrodes may be insulated from the fourth plurality of electrodes by an insulating layer, thereby minimizing the complexity of the manufacture of the display device.

Furthermore, an in-plane electrophoretic display may have pixels each comprising a first viewing electrode, a second viewing electrode, a gate electrode, and a collector electrode. Advantageously, the plurality of first electrodes may be used to supply the common signal to the first viewing electrodes, the plurality of second electrodes may be used to supply the further common signal to the second viewing electrodes, the plurality of third electrodes may be used to control the gate electrodes, and the plurality of fourth electrodes may be used to control the collector electrodes.

Additionally, each respective first electrode may be used to supply the common signal to the first viewing electrodes of the pixels within in a respective row, and each respective second electrode may be used to supply the further common signal to the second viewing electrodes of the pixels comprised in a respective row.

Alternatively, each respective first electrode may be used to supply the common signal to the first viewing electrodes of the pixels within in a respective row, and each respective second electrode may be used to supply the further common signal to the second viewing electrodes of the pixels comprised in a respective pair of rows. Hence, a second electrode may connect to or form portions of the second viewing electrodes of two rows of pixels, rather than just one row of pixels, and therefore the total number of second electrodes is decreased. This enables a higher aperture ratio, as there is less display area taken up by the electrodes. This also enables a higher manufacturing yield, and a lower risk of faults occurring during the displays use, since the overall number of crossovers decreases.

Embodiments of the invention will now be described, by way of example only, and with reference to the accompanying drawings, in which.

Figure 1:
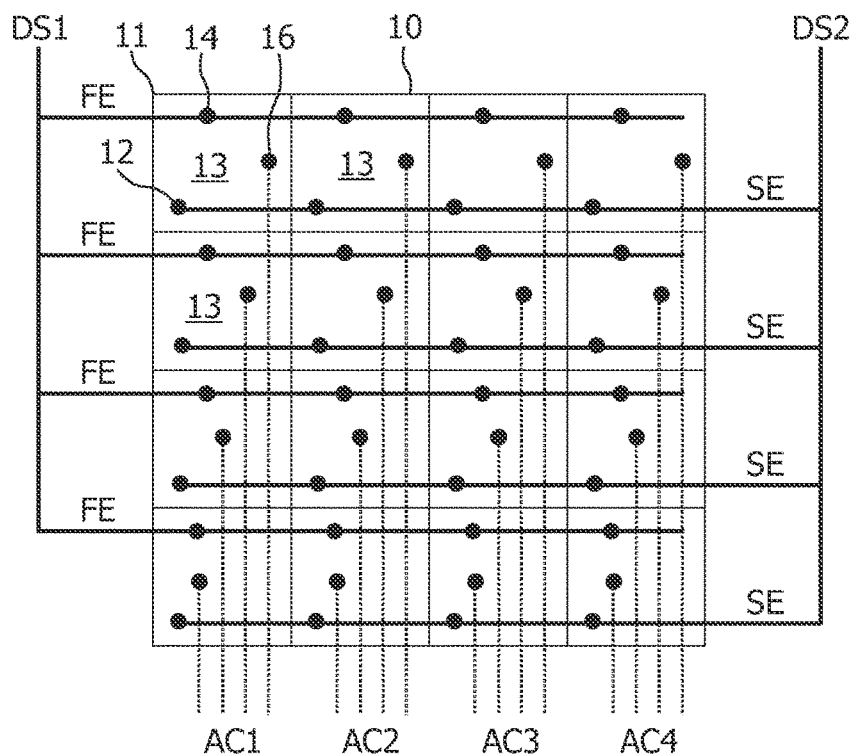
FIG. 1 shows a schematic diagram of a display device according to a first embodiment of the invention.

A first embodiment of the invention is now described with reference to FIG. 1. A display device 10 comprises an array of four rows and four columns of pixels 13 arranged on a common substrate 11. The display device 10 comprises a plurality of first electrodes FE, a plurality of second electrodes SE, and a pixel addressing electrode for each pixel. The pixel addressing electrodes for the first column are labeled as AC1, for the second column AC2, the third column AC3, and the fourth column AC4. The plurality of first electrodes FE are all commonly controlled by a drive signal DS1 (the common signal), and the plurality of second electrodes SE are all commonly controlled by a drive signal DS2 (the further common signal). The pluralities of pixel addressing electrodes AC1, AC2, AC3, and AC4, are used to supply data to the pixels to control the optical appearances of each individual pixel.

Each pixel in the display device has three connections; one connection 14 to a first electrode FE, one connection 12 to a second electrode SE, and one connection 16 to a pixel addressing electrode. These connections may be connections to electrodes of the pixel that control the pixels optical appearance directly, or they may be connections to active switching circuitry for controlling the pixel.

Each row of pixels has a first electrode FE extending through the row of pixels, and a second electrode SE extending through the row of pixels. The pixel addressing electrodes extend in the column direction, and each pixel addressing electrode extends from a pixel to the lower side of the array.

The first electrodes FE may be connected together to the drive signal DS1, and the second electrodes SE may be connected together to the drive signal DS2, at any location between the edge of the pixel array and the connection to the DS1 and DS2 drive signals. For example, the electrodes may be connected together at the periphery of the pixel array, or on a flex foil between the pixel array and a driver chip, or even within the driver chip itself.

The first electrodes FE and the second electrodes SE all extend in the row direction and so are parallel to one another. This minimizes the total number of crossovers in the array, and removes all the crossovers between the commonly controlled first electrodes FE and the commonly controlled second electrodes SE. Hence, the likelihood of a short-circuit, and in particular the likelihood of a short-circuit between a first electrode and a second electrode, is minimized.

The first, second, and pixel addressing electrodes are all arranged on a common substrate 11, and hence there is no requirement to pattern any of these electrodes on further substrates for forming the same display device.

For clarity, the display device of FIG. 1 only comprises sixteen pixels, although real display devices may comprise hundreds of thousands of pixels.

A second embodiment of the invention is now described with reference to FIGS. 2, 3 and 4.

Figure 2:
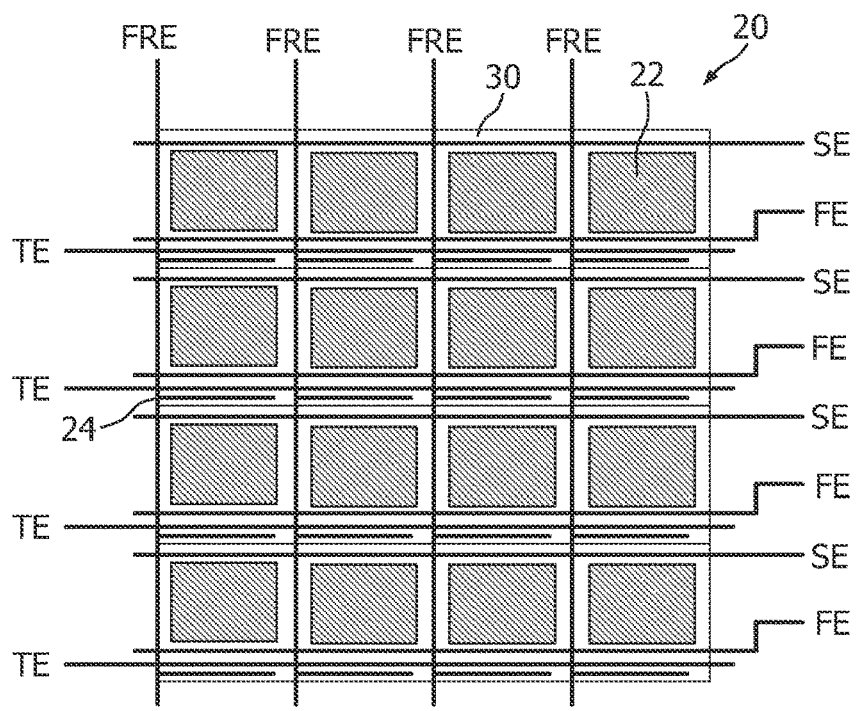
FIG. 2 shows a schematic diagram of a display device according to a second embodiment of the invention.

Looking at FIG. 2, an in-plane electrophoretic display device 20 comprises sixteen adjoining pixels 30 arranged in an array of four rows and four columns. The active areas (e.g. 22), which are controlled to change the pixels optical appearances, are shown as shaded areas. The electrophoretic display device also comprises a plurality of first electrodes FE, a plurality of second electrodes SE, and a plurality of pixel addressing electrodes that comprise a plurality of third electrodes TE and a plurality of fourth electrodes FRE. The plurality of first electrodes FE are commonly controlled, the plurality of second electrodes SE are commonly controlled, and the pluralities of third and fourth electrodes are controlled individually so that they can be used to address the individual pixels.

In this embodiment, the pixels adjoin one another, and so the pluralities of electrodes extend through the pixels. However, in other embodiments the boundaries of each pixel could be defined differently, and so the pluralities of electrodes could be considered to extend alongside the pixels rather than through the pixels. For example, a pixel could be considered to be an active area 22.

The pluralities of first FE, second SE, third TE, and fourth FRE electrodes are all arranged on a common substrate (40). The pluralities of first, second, and third electrodes are arranged parallel to one another in the row direction and so do not cross one another within the array. The plurality of fourth electrodes cross the pluralities of first, second, and third electrodes, and so they are separated from the first, second and third electrodes by an insulating layer.

The pluralities of first FE, second SE, third TE, and fourth FRE electrodes together form a passive matrix for controlling the in-plane electrophoretic pixels 30.

Figure 3:
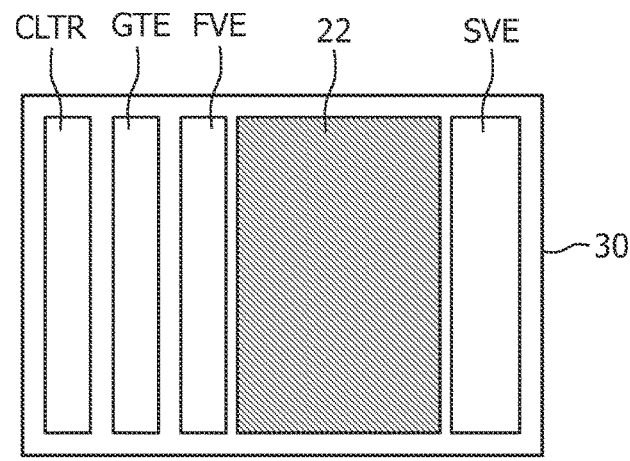
FIG. 3 shows a schematic diagram of an electrophoretic pixel comprised in the display device of the second embodiment.

FIG. 3 shows one of the in-plane electrophoretic pixels of display device 20. The pixel 30 has a collector electrode CLTR, a gate electrode GTE, a first viewing electrode FVE, and a second viewing electrode SVE. These four electrodes are used to control the number of charged particles that are present within the active area 22. Typically, the collector CLTR electrode is used to store charged particles away from the active area, the gate electrode GTE is used to attract a particular number of charged particles from the region of the collector electrode to the region of the gate electrode, the first viewing electrode FVE is used to draw the charged particles from the region of the gate electrode to the active area 22, and the second viewing electrode SVE is used to draw the charged particles from the region of the first viewing electrode into the active area 22, thereby altering the pixels optical appearance.

Within the display device 20, each pixels first viewing electrode FVE is a portion of a first electrode FE, its second viewing electrode SVE is a portion of a second electrode SE, its gate electrode GTE is a portion of a third electrode TE, and its collector electrode CLTR is a portion of a fourth electrode FRE.

Within the display device 20, each first electrode FE forms portions of the first viewing electrodes FVE of the pixels within a respective row, each second electrode SE forms portions of the second viewing electrodes SVE of the pixels within a respective row, each third electrode TE forms portions of the gate electrodes GTE of the pixels within a respective row, and each fourth electrode FRE is connected 24 to the collector electrodes CLTR of the pixels within a respective column.

To address the display device 20, firstly the pixels' collector CLTR and gate GTE electrodes are addressed sequentially by the pluralities of third TE and fourth FRE electrodes, secondly the pixels' first viewing electrodes FVE are all addressed at the same time by the commonly controlled plurality of first electrodes FE, and thirdly the pixels' second viewing electrodes SVE are all addressed at the same time by the commonly controlled plurality of second electrodes SE.

Figure 4:
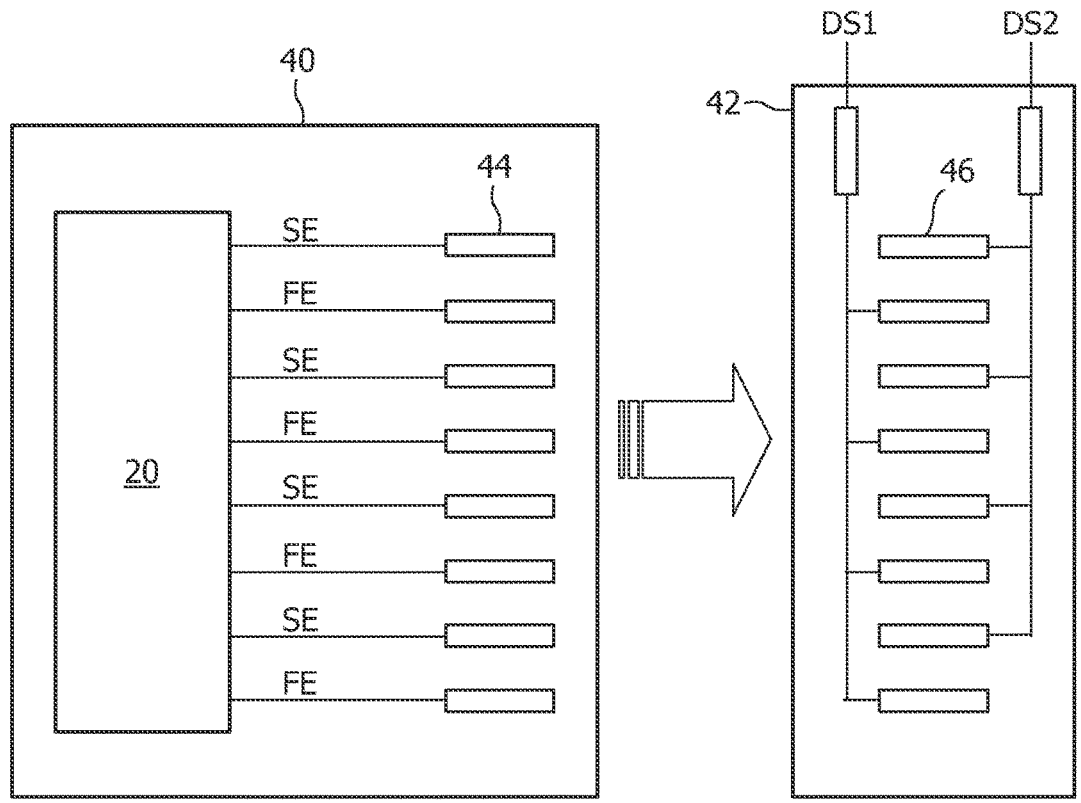
FIG. 4 shows a schematic diagram of flex foil for connecting the display device of the second embodiment to a driver chip.

FIG. 4 shows how the pluralities of first FE and second SE electrodes are commonly connected to two drive signals, DS1 and DS2. The substrate 40 carries the pixels and the pluralities of first, second, third, and fourth electrodes that form the display device 20. The details of the display device 20 are not shown for clarity. Around the periphery of display device 20 are eight connection pads (e.g. 44) that are connected to the first electrodes FE and the second electrode SE of the display device 20. These pads are then respectively connected to eight connection pads (e.g. 46) of a flex foil connector 42. The flex foil connector connects all of the first electrodes FE to a connection pad for receiving a drive signal DS1, and connects all of the second electrodes SE to a connection pad for receiving a drive signal DS2. The drive signals may be received by connecting the flex foil to a driver chip. Additional flex foils are used for connecting the pluralities of third and fourth electrodes to driver chip(s).

This embodiment provides an electrode layout that minimizes the overall number of crossovers, and in particular does not have any crossovers within the array between the commonly controlled first plurality and the commonly controlled second plurality of electrodes. The electrode layout is well suited to in-plane electrophoretic pixels that each require two addressing electrodes and two commonly controlled electrodes.

The flex foil 42 may be bonded to the display substrate 40 using an anisotropic glue layer (ACF), as will be apparent to those skilled in the art. The chances of short-circuits occurring in flex foils are typically much lower than the chances of short-circuits occurring at crossovers between array electrodes.

In an alternative embodiment, the first electrodes may be connected together and the second electrodes may be connected together around the periphery of display device 20, for example on the substrate 40. This has the advantage that only two connections (one for the drive signal to the first electrodes, and one for the drive signal to the second electrodes) are required from the substrate 40 to the flex foil that connects to the driver chip. Furthermore, any crossovers between the first and second electrodes in the peripheral circuitry may be less likely to cause short-circuits than they would in the array, since there may be more freedom to form robust crossovers in the peripheral circuitry than within the array.

In a further embodiment, all of the first and second electrodes may be connected directly to the driver chip. This requires many more connections to the driver chip (one connection for every first/second electrode), although the risk of shorts occurring within the driver chip is typically very low, due to the mature processes that are typically used to fabricate the chip.

A third embodiment of the invention is now described with reference to FIGS. 5 and 6.

Figure 5:
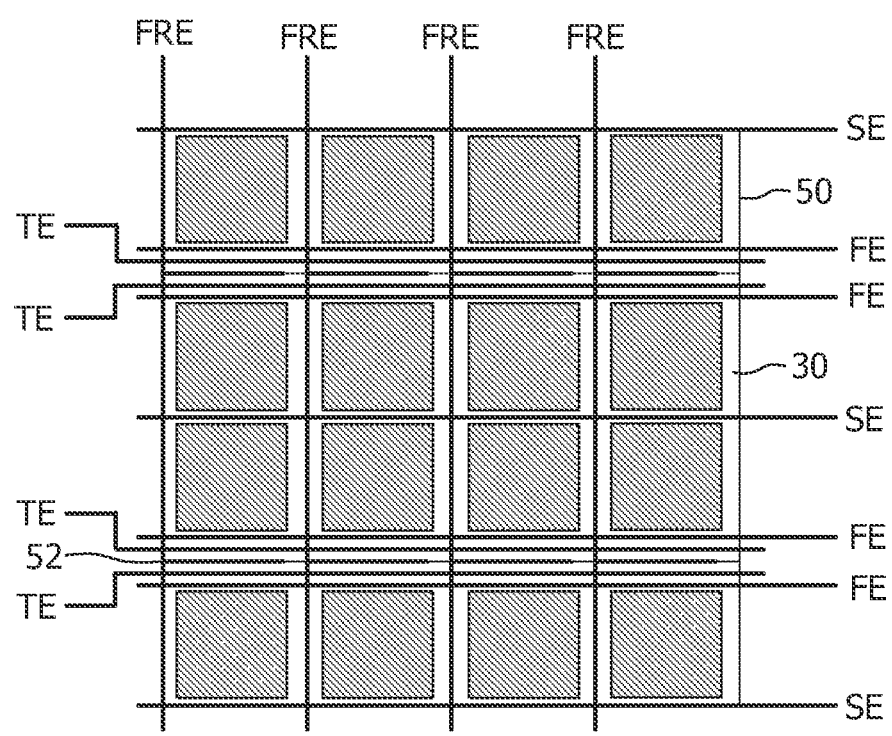
FIG. 5 shows a schematic diagram of a display device comprising sixteen of the pixels of FIG. 3 according to a third embodiment of the invention.

FIG. 5 shows an in-plane electrophoretic display device 50 comprising sixteen of the in-plane electrophoretic pixels 30 of FIG. 3, and pluralities of first FE, second SE, third TE, and fourth FRE electrodes that are arranged differently to the electrodes of the second embodiment. In particular, neighboring rows of pixels are symmetrical to one another, and hence each second electrode forms portions of the second viewing electrodes of the pixels within a respective adjacent pair of rows, rather than within a respective single row, as is the case in the second embodiment.

Since this results in a lower number of second electrodes, there is a lower number of crossovers in the array, and so the chances of a short-circuit occurring are reduced. Furthermore, there is more array area available for use as active pixel area, and so the brightness and contrast of the display is increased.

Figure 6:
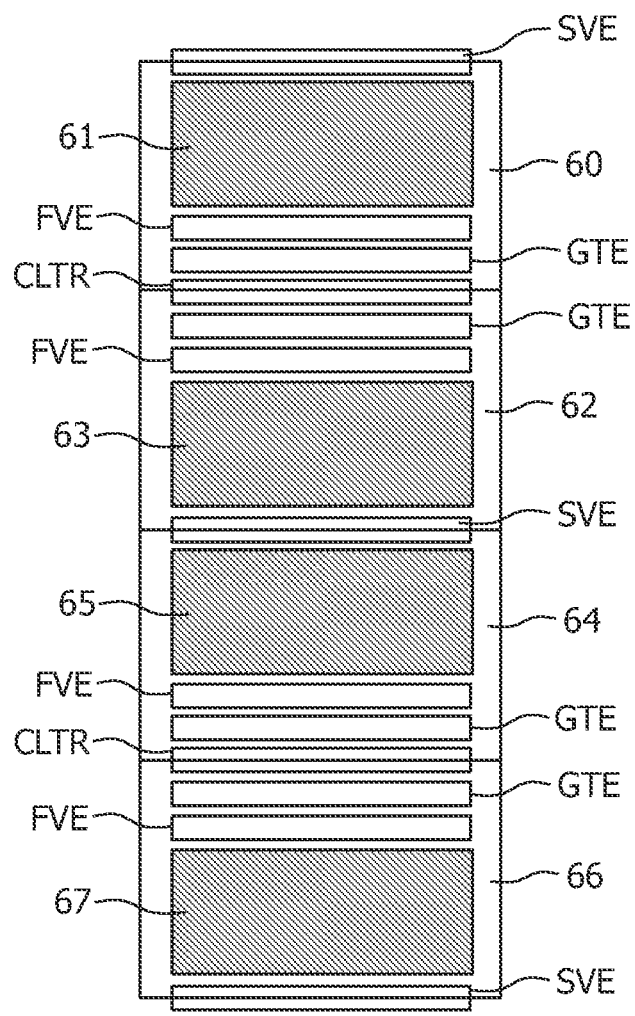
FIG. 6 shows a schematic diagram of a column of four of the pixels of FIG. 3 within the display device of the third embodiment.

FIG. 6 shows a column of four pixels 30 of display device 50 in more detail. The four pixels are individually labeled as 60, 62, 64, and 66, and have respective active areas 61, 63, 65, and 67. The first viewing electrodes FVE of the pixels form portions of the first electrodes FE of display device 50, the second viewing electrodes SVE of the pixels form portions of the second electrodes SE of display device 50, the gate electrodes GTE of the pixels form portion of the third electrodes TE of display device 50, and the collector electrodes CLTR of the pixels are connected 52 to the fourth electrodes FRE of display device 50. As can be seen from FIG. 6, one of the second viewing electrodes SVE are shared between pixels 62 and 64 of an adjacent pair of rows. Clearly, the number of second viewing electrodes that are shared between pixels of adjacent pairs of rows will increase as the number of rows are increased.

The symmetrical rows layout also enables the collector CLTR electrodes to be shared between pixels of adjacent rows, further increasing the area of the array that is available for use as active area.

In summary, there is disclosed a display device having an improved electrode layout. The display device comprises an array of rows and columns of pixels. The display device further comprises a plurality of commonly controlled first electrodes for supplying a common signal to each pixel, a plurality of commonly controlled second electrodes for supplying a further common signal to each pixel, and a plurality of pixel addressing electrodes for addressing the individual pixels. At least the plurality of first electrodes and the plurality of second electrodes are routed parallel to one another, such that crossovers between the commonly controlled electrodes are eliminated.

Although reference has been made to rows and columns in the description, it will be appreciated that these terms can be interchanged. For example, if the display is rotated by 90° then the rows may be considered as columns and the columns may be considered as rows. In essence, the rows and columns extend in directions that are orthogonal to one another.

Other embodiments falling within the scope of the appended claims will also be apparent to those skilled in the art. In particular, various features of the embodiments described herein may be combined to form further embodiments. Reference signs in the claims are not to be construed so as to limit the scope of the claims.

The invention claimed is:

1. A display device, comprising an array of rows and columns of pixels, the array comprising:
    a commonly controlled plurality of first electrodes for supplying a first common drive signal to each pixel of the array, each first electrode extending through or alongside a row of pixels for supplying the common drive signal to the pixels of the row, wherein the plurality of first electrodes are connected together to supply said common drive signal;
    a commonly controlled plurality of second electrodes for supplying a second common drive signal different from the first common drive signal to each pixel of the array, each second electrode extending through or alongside a row of pixels for supplying the second common drive signal to the pixels of the row, wherein the plurality of second electrodes are connected together to supply said second common drive signal; and
    a plurality of pixel addressing electrodes for supplying data to the pixels to control optical appearances of the pixels; and
    wherein at least the first and second pluralities of electrodes are arranged on a common substrate.

2. The display device according to claim 1, wherein:
    each row of pixels is associated with a first electrode that extends from a first pixel of the row to a last pixel of the row; and
    each row of pixels is associated with a second electrode that extends from the first pixel of the row to the last pixel of the row.

3. The display device according to claim 1, wherein the pluralities of electrodes at least partially form a passive matrix for controlling the pixels of the display.

4. The display device according to claim 1, wherein the pixels are in-plane electrophoretic pixels.

5. The display device according to claim 1, wherein the plurality of pixel addressing electrodes comprise a plurality of third electrodes and a plurality of fourth electrodes, each third electrode extending through or alongside a row of pixels, and each fourth electrode extending through or alongside a column of pixels.

6. The display device according to claim 5, wherein the pluralities of first, second, third and fourth electrodes are all arranged on the common substrate.

7. The display device according to claim 6, wherein an insulating layer insulates the pluralities of first, second, and third electrodes from the plurality of fourth electrodes.

8. The display device according to claim 5, wherein the pixels are in-plane electrophoretic pixels, and wherein each pixel comprises:
    a first viewing electrode, the first viewing electrode being connected to or forming a portion of a first electrode;
    a second viewing electrode, the second viewing electrode being connected to or forming a portion of a second electrode;
    a gate electrode, the gate electrode being connected to or forming a portion of a third electrode; and
    a collector electrode, the collector electrode being connected to or forming a portion of a fourth electrode.

9. The display device according to claim 8, wherein each first electrode is connected to or forms portions of the first viewing electrodes of the pixels within a respective row, and wherein each second electrode is connected to or forms portions of the second viewing electrodes of the pixels within a respective row.

10. The display device according to claim 8, wherein each first electrode is connected to or forms portions of the first viewing electrodes of the pixels within a respective row, and wherein each second electrode is connected to or forms portions of the second viewing electrodes of the pixels within a respective pair of rows.

* * * * *